United States Patent
Lim et al.

(10) Patent No.: US 7,634,369 B2
(45) Date of Patent: Dec. 15, 2009

(54) BATTERY MANAGEMENT SYSTEM (BMS) AND DRIVING METHOD THEREOF

(75) Inventors: Gye-Jong Lim, Suwon-si (KR); Soo-Seok Choi, Suwon-si (KR); Young-Jo Lee, Suwon-si (KR); Yong-Jun Tae, Suwon-si (KR); Han-Seok Yun, Suwon-si (KR); Se-Wook Seo, Suwon-si (KR); Beom-Gyu Kim, Suwon-si (KR); Ho-Young Park, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 7 days.

(21) Appl. No.: 11/882,464

(22) Filed: Aug. 1, 2007

(65) Prior Publication Data
US 2008/0091363 A1    Apr. 17, 2008

(30) Foreign Application Priority Data
Oct. 12, 2006    (KR)    ............ 10-2006-0099339

(51) Int. Cl.
G01R 31/36    (2006.01)
H02J 7/00    (2006.01)
(52) U.S. Cl. .................................. 702/63; 320/130
(58) Field of Classification Search ............ 702/63, 702/64, 65; 324/426, 428, 430; 320/130, 320/132, 134
See application file for complete search history.

(56) References Cited

U.S. PATENT DOCUMENTS

| | | |
|---|---|---|
| 5,153,496 A | 10/1992 | LaForge |
| 5,321,627 A | 6/1994 | Reher |
| 5,666,040 A | 9/1997 | Bourbeau |
| 5,701,068 A * | 12/1997 | Baer et al. ................ 320/119 |
| 5,773,959 A | 6/1998 | Merritt et al. |
| 5,773,962 A | 6/1998 | Nor |
| 5,796,334 A | 8/1998 | Chen et al. |
| 5,952,815 A | 9/1999 | Rouillard et al. |
| 6,014,013 A | 1/2000 | Suppanz et al. |
| 6,078,165 A | 6/2000 | Ashtiani et al. |

(Continued)

FOREIGN PATENT DOCUMENTS

CN    1415973 A    5/2003

(Continued)

OTHER PUBLICATIONS

U.S. Appl. No. 11/882,466, Aug. 1, 2007, Lim et al.

(Continued)

*Primary Examiner*—Bryan Bui
(74) *Attorney, Agent, or Firm*—Robert E. Bushnell, Esq.

(57) ABSTRACT

A Battery Management System (BMS) and a battery management method include a sensing unit to measure a battery terminal voltage, current, and temperature, and a Main Control Unit (MCU) to compare the measured battery terminal voltage, current, and temperature to a State of Charge (SOC) reset condition and to reset a battery estimate SOC according to the comparison result. The MCU resets the battery estimate SOC to a first reset SOC when the SOC reset condition corresponds to a first SOC and reset the battery estimate SOC at a second reset SOC when the SOC reset condition corresponds to a second SOC.

10 Claims, 5 Drawing Sheets

U.S. PATENT DOCUMENTS

| | | |
|---|---|---|
| 6,104,166 A | 8/2000 | Kikuchi et al. |
| 6,127,806 A | 10/2000 | Tanjo et al. |
| 6,157,169 A | 12/2000 | Lee |
| 6,255,826 B1 | 7/2001 | Ohsawa et al. |
| 6,300,763 B1 | 10/2001 | Kwok |
| 6,336,063 B1 | 1/2002 | Lennevi |
| 6,377,030 B1 | 4/2002 | Asao et al. |
| 6,411,063 B1 | 6/2002 | Kouzu et al. |
| 6,472,880 B1 | 10/2002 | Kang |
| 6,621,250 B1 | 9/2003 | Ohkubo et al. |
| 6,639,409 B2 | 10/2003 | Morimoto et al. |
| 6,803,766 B2 | 10/2004 | Kobayashi et al. |
| 7,126,342 B2 | 10/2006 | Iwabuchi et al. |
| 2001/0035737 A1 | 11/2001 | Nakanishi et al. |
| 2002/0030494 A1 | 3/2002 | Araki et al. |
| 2002/0113595 A1 | 8/2002 | Sakai et al. |
| 2003/0025481 A1 | 2/2003 | Bertness |
| 2003/0146737 A1 | 8/2003 | Kadouchi et al. |
| 2003/0189419 A1 | 10/2003 | Maki et al. |
| 2004/0109274 A1 | 6/2004 | Sato |
| 2005/0156603 A1 | 7/2005 | Lin et al. |
| 2005/0269991 A1 | 12/2005 | Mitsui et al. |
| 2006/0028179 A1 | 2/2006 | Yudahira et al. |
| 2006/0181245 A1 | 8/2006 | Mizuno et al. |
| 2006/0202663 A1 | 9/2006 | Cho et al. |
| 2007/0090802 A1 | 4/2007 | Seo |
| 2007/0090803 A1 | 4/2007 | Yun et al. |
| 2008/0077339 A1* | 3/2008 | Seo et al. ...................... 702/63 |

FOREIGN PATENT DOCUMENTS

| | | |
|---|---|---|
| CN | 1604383 A | 4/2005 |
| EP | 0990913 A1 | 4/2000 |
| EP | 1081499 A1 | 3/2001 |
| EP | 1203964 A2 | 5/2002 |
| EP | 1841003 A1 | 10/2007 |
| JP | 06231806 | 8/1994 |
| JP | 11160367 | 6/1999 |
| JP | 2000-069606 | 3/2000 |
| JP | 2000-134705 | 5/2000 |
| JP | 2000-217261 | 8/2000 |
| JP | 2000-228832 | 8/2000 |
| JP | 2000-324702 | 11/2000 |
| JP | 2000-340267 | 12/2000 |
| JP | 2000-357541 | 12/2000 |
| JP | 2001-086656 | 3/2001 |
| JP | 2001-116776 | 4/2001 |
| JP | 2002042906 | 2/2002 |
| JP | 2002-199510 | 7/2002 |
| JP | 2003-084015 | 3/2003 |
| JP | 2003134675 | 5/2003 |
| JP | 2004079324 | 3/2004 |
| JP | 2004-180397 | 6/2004 |
| JP | 2004-222433 | 8/2004 |
| JP | 2005-269752 | 9/2005 |
| JP | 2006-014480 | 1/2006 |
| JP | 2006-047130 | 2/2006 |
| KR | 19920009697 | 9/1989 |
| KR | 1997-0048597 A | 7/1997 |
| KR | 1998064646 | 10/1998 |
| KR | 0216808 B1 | 6/1999 |
| KR | 2001-0043872 A | 5/2001 |
| KR | 20020064998 | 8/2002 |
| KR | 2003-0065757 A | 8/2003 |
| KR | 10-2004-0005133 | 1/2004 |
| KR | 20040092943 | 11/2004 |
| KR | 20040111144 | 12/2004 |
| KR | 2005-0019856 A | 3/2005 |
| KR | 2005-0026360 A | 3/2005 |
| KR | 20050089816 | 9/2005 |
| KR | 0534818 A | 12/2005 |
| KR | 2006-0059680 A | 6/2006 |
| KR | 2006-0079505 A | 7/2006 |
| KR | 2006-0094897 A | 8/2006 |
| KR | 10-2007-0003628 | 1/2007 |
| KR | 2007-0029937 A | 3/2007 |
| WO | 2007007655 | 1/2007 |

OTHER PUBLICATIONS

State of charge (Wikipedia-2 pages) print out from http://en.wikipedia.org/wiki/State_of—charge.

Custom Power Solutions (10 pages) print out from http://www.mpoweruk.com/soc.htm.

* cited by examiner

BATTERY MANAGEMENT SYSTEM (BMS) AND DRIVING METHOD THEREOF

CLAIM OF PRIORITY

This application makes reference to, incorporates the same herein, and claims all benefits accruing under 35 U.S.C. §119 from an application for BATTERY MANAGEMENT SYSTEM AND DRIVING METHOD THEREOF earlier filed in the Korean Intellectual Property Office on 12 Oct. 2006 and there duly assigned Serial No. 10-2006-0099339.

BACKGROUND OF THE INVENTION

1. Field of the Invention

The present invention relates to a Battery Management System (BMS) and a battery management method. More particularly, the present invention relates to a BMS of a vehicle utilizing electrical energy.

2. Description of the Related Art

Vehicles using a gasoline or diesel internal combustion engine have caused serious air pollution. Accordingly, efforts to develop electric or hybrid vehicles have recently been made to reduce air pollution.

An electric vehicle uses an electric motor run by electrical energy output by a battery. Since the electric vehicle mainly uses a battery formed of one battery pack including a plurality of rechargeable/dischargeable secondary cells, there is merit in that it has no emission gases and less noise.

A hybrid vehicle commonly refers to a gasoline-electric hybrid vehicle that uses gasoline to power an internal combustion engine and an electric battery to power an electric motor. Recently, hybrid vehicles using an internal combustion engine and fuel cells and hybrid vehicles using a battery and fuel cells have been developed. The fuel cells directly obtain electrical energy by generating a chemical reaction while hydrogen and oxygen are continuously provided.

In such a vehicle using an electric motor, the number of rechargeable batteries (cells) has been increased so as to improve a power source thereof, and a cell balancing control method capable of efficiently managing a plurality of coupled cells and packs is needed for a Battery Management System (BMS).

Particularly, a State of Charge (SOC) is measured by an Open Circuit Voltage (OCV) of key-on, and an initial SOC is estimated using an OCV table corresponding to the SOC and temperature. The SOC is then estimated by integrating a current to obtain the estimated initial SOC.

The battery estimate SOC is reset at a reset SOC corresponding to an SOC reset condition when the battery terminal voltage Vt, the battery current i, and the battery temperature T are satisfied by the SOC reset condition. Since the reset SOC may not correct reset estimate errors in the SOC reset condition, each SOC value corresponding to the SOC reset condition becomes the reset SOC. When the SOC reset condition correspond to overcharge threshold ranges or an over-discharge threshold range, an overcharge and over-discharge of the battery can occur due to the reset estimate error of the SOC reset condition.

SUMMARY OF THE INVENTION

The present invention has been made in an effort to provide a Battery Management System (BMS) and a driving method thereof having advantages of resetting a battery estimate State of Charge (SOC) by compensating for reset estimate errors in the SOC reset condition corresponding to an overcharge and over-discharge threshold ranges.

An exemplary embodiment of the present invention provides a Battery Management System (BMS) to managing a battery, the BMS including: a sensing unit to measure a battery terminal voltage, current, and temperature; and a Main Control Unit (MCU) to compare the measured battery terminal voltage, current, and temperature to a State of Charge (SOC) reset condition and to reset a battery estimate SOC according to the comparison result: the MCU resets the battery estimate SOC to a first reset SOC in response to the SOC reset condition corresponding to a first SOC and resets the battery estimate SOC to a second reset SOC in response to the SOC reset condition corresponding to a second SOC.

The first reset SOC is preferably different from the first SOC and compensates for a reset estimate error to the first SOC, the reset estimate error occurring in the SOC reset condition corresponding to the first SOC.

The second reset SOC is preferably different from the second SOC and compensates for a reset estimate error to the second SOC, the reset estimate error occurring in the SOC reset condition corresponding to the second SOC.

The first SOC is preferably a minimum value within an overcharge threshold range of the battery.

The second SOC is preferably a maximum value within an overcharge threshold range of the battery.

An exemplary embodiment of the present invention also provides a method of driving a Battery Management System (BMS) for managing a battery, the driving method including: measuring a battery terminal voltage, current, and temperature and comparing the measured battery terminal voltage, current, and temperature to an SOC reset condition; resetting the battery estimate SOC to a first reset SOC when the SOC reset condition corresponds to a first SOC; and resetting the battery estimate SOC to a second reset SOC when the SOC reset condition corresponds to a second SOC.

The first reset SOC is preferably different from the first SOC and compensates for a reset estimate error to the first SOC, the reset estimate error occurring in the SOC reset condition corresponding to the first SOC.

The second reset SOC is preferably different from the second SOC and compensates for a reset estimate error to the second SOC, the reset estimate error occurring in the SOC reset condition corresponding to the second SOC.

The first SOC is preferably a minimum value within an overcharge threshold range of the battery.

The second SOC is preferably a maximum value within an overcharge threshold range of the battery.

BRIEF DESCRIPTION OF THE DRAWINGS

A more complete appreciation of the present invention and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Figure 1:
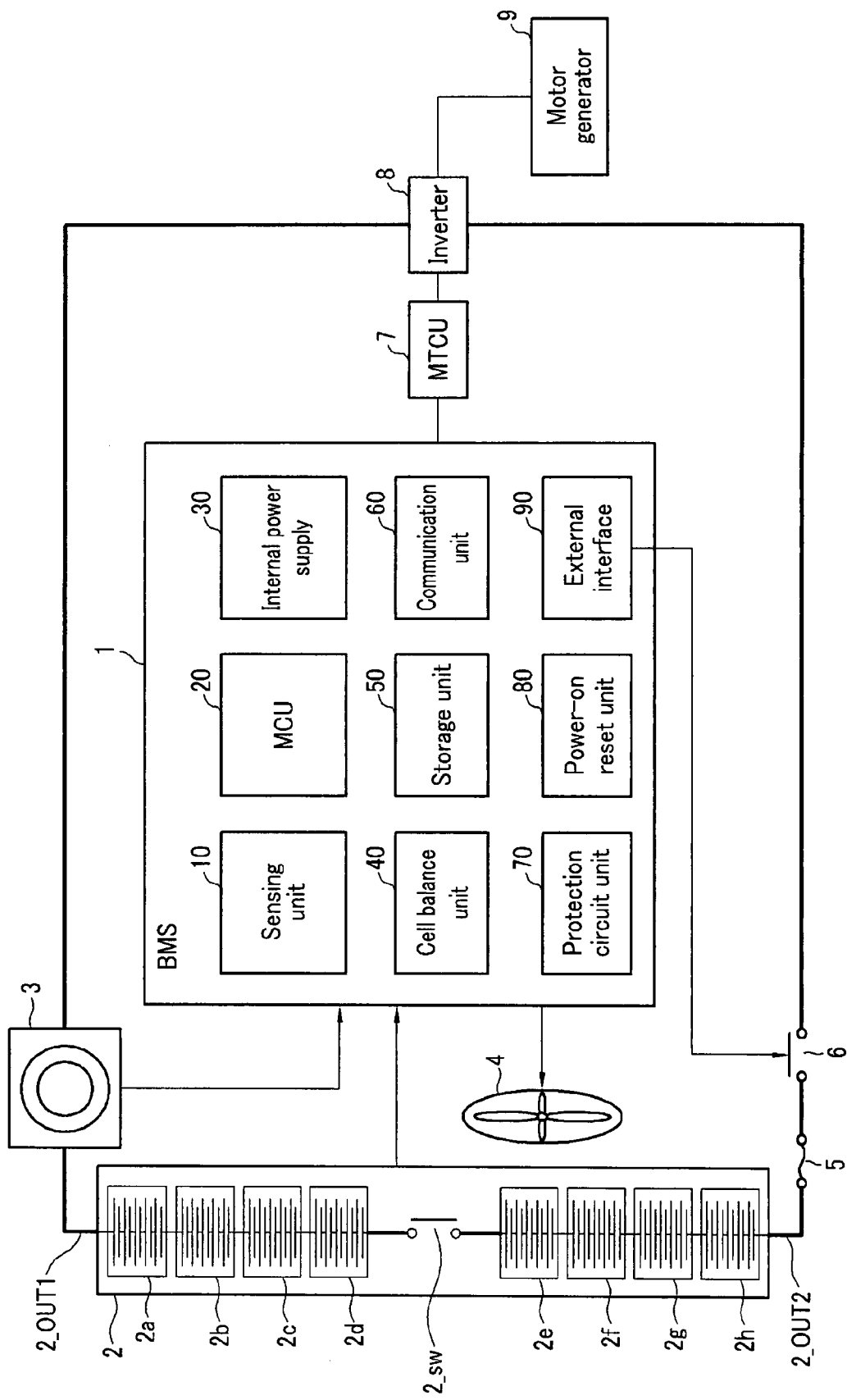
FIG. 1 is a block diagram of a battery, BMS, and BMS peripheral devices according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and claims which follow, when it is described that an element is coupled to another element, the element may be directly coupled to the other element or electrically coupled to the other element through a third element. Throughout this specification and the claims which follow, unless explicitly described to the contrary, the word "comprise/include" or variations such as "comprises/includes" or "comprising/including" will be understood to imply the inclusion of stated elements but not the exclusion of any other elements.

FIG. 1 is a block diagram of a battery 2, BMS 1, and peripheral devices thereof.

As shown in FIG. 1, the motor system includes a BMS 1, a battery 2, a current sensor 3, a cooling fan 4, a fuse 5, a main switch 6, a MoTor Control Unit (MTCU) 7, an inverter 8, and a motor generator 9.

The battery 2 includes a plurality of sub-packs $2a$ to $2h$ formed of a plurality of battery cells coupled in series with each other, output terminals 2_OUT1 and 2_OUT2, and a safety switch 2_SW provided between the sub-pack $2d$ and the sub-pack $2e$. The eight sub-packs $2a$ to $2h$ are exemplarily illustrated and each sub-pack is formed by grouping a plurality of battery cells in one group, but this is not restrictive. In addition, the safety switch 2_SW is provided between the sub-pack $2d$ and the sub-pack $2e$, and is manually turned on or off for a user's safety when the user changes a battery or performs a battery-related operation. In the present exemplary embodiment, the safety switch 2_SW is provided between the sub-pack $2d$ and the sub-pack $2e$, but this is not restrictive. The output terminals 2_OUT1 and 2_OUT2 are coupled to the inverter 8.

The current sensor 3 measures the amount of output current of the battery 2, and outputs the measured amount to a sensor 10 of the BMS 1. In more detail, the current sensor 3 may be a Hall Effect Current Transformer (Hall Effect CT) that measures the amount of output current by using a Hall Effect element and outputs an analog current signal corresponding to the measured amount.

The cooling fan 4 removes heat generated by charging/discharging the battery 2 in response to a control signal from the BMS 1, and prevents deterioration and reduction of charge/discharge efficiency of the battery 2 that are caused by a temperature increase.

The fuse 5 prevents an overflow current that may be caused by a disconnection or a short circuit of the battery 2 from being transmitted to the battery 2. That is, when the current overflows, the fuse 5 is discoupled so as to interrupt the current from overflowing.

The main switch 6 turns the battery 2 on and off in response to the control signal from the BMS 1 or from the MTCU 7 when an unusual phenomenon, including an over-voltage, an over-current, and a high temperature, occurs.

The BMS 1 includes the sensing unit 10, a Main Control Unit (MCU) 20, an internal power supply 30, a cell balance unit 40, a storage unit 50, a communication unit 60, a protection circuit unit 70, a power-on reset unit 80, and an external interface 90.

The sensor 10 measures a battery terminal voltage Vt, a battery temperature T, and a battery current i and transmits the measured values to the MCU 20.

The MCU 20 receives a present battery terminal voltage Vt, a present battery current i, and a present battery temperature T, compares them to the SOC reset condition, and resets a battery estimate SOC depending on a comparison result thereof. According to an exemplary embodiment of the present invention, the SOC reset condition means a comparison condition for forcibly changing the battery estimate SOC into a predetermined reset SOC value so as to correct for an SOC estimate error of the battery. Specifically, the SOC reset condition may include factors such as the battery terminal voltage Vt, battery current i, battery temperature T, and SOH. In addition, the SOC reset condition may include a predetermined time which the above factors satisfy the SOC reset condition. According to an exemplary embodiment of the present invention, the SOH may be estimated using an internal resistance and the battery terminal voltage. Specifically, the MCU 20 receives a battery terminal voltage Vt, a battery current i, and a battery temperature T from the sensing unit 10. The MCU 20 compares the received battery terminal voltage Vt, battery current i, and battery temperature T to the SOC reset condition. The MCU 20 then resets a battery estimate SOC at a reset SOC 23%, 40%, 70% and 87% corresponding to each area SOC 25%, 40%, 70% and 85% when the received battery terminal voltage Vt, battery current i, and battery temperature T satisfy the SOC reset condition. The MCU 20 establishes a predetermined SOC range as an available range, and controls a running battery SOC to be included in the available range. In addition, the MCU 20 establishes an overcharge and over-discharge threshold range so as to prevent an overcharge and over-discharge, and may control an SOC to be included in the overcharge and over-discharge threshold range. According to an exemplary embodiment of the present invention, the SOC corresponding to the overcharge and over-discharge threshold range is defined as a first SOC (SOC 85%) and a second SOC (SOC 25%), and the SOC corresponding to the available range is defined as a third SOC (SOC 40%) and a fourth SOC (SOC 70%). The MCU 20 corrects a reset estimate error (SOC 2%) of the SOC reset condition and reset a battery reset SOC when the SOC reset condition satisfies the first SOC (SOC 85%) and the second SOC (SOC 25%) corresponding to the overcharge and over-discharge threshold range. Accordingly, the MCU 20 resets a battery estimate SOC at the first reset SOC (SOC 87%) when the SOC reset condition satisfies the first SOC (SOC 85%). The MCU 20 resets a battery estimate SOC at the first reset SOC (SOC 23%) when the SOC reset condition satisfies the second SOC (SOC 25%). In addition, the MCU 20 resets a battery estimate SOC at the third reset SOC (SOC 40%) and the fourth reset SOC (SOC 70%) for not correcting the reset estimate error (SOC 2%) when the SOC reset condition satisfies the third SOC (SOC 40%) and the fourth SOC (SOC 70%) corresponding to the available range. In addition, the MCU 30 estimates the SOC and a State of Health (SOH)

using the received battery terminal voltage Vt, battery current i, and battery temperature T, and accordingly, controls the battery charge and discharge.

The internal power supply 30 supplies a power to the BMS 1 by using a backup battery. The cell balance unit 40 balances the charging stage of each cell. That is, cells that are relatively highly charged are discharged, and cells that are relatively less charged are further charged. The storage unit 50 stores data of a present SOC or SOH when the power source of the BMS 1 is turned off. An Electrically Erasable Programmable Read-Only Memory (EEPROM) may be used for the storage unit 50. The communication unit 60 communicates with the MTCU 7 of the vehicle system. The communication unit 60 transmits SOC and SOH information from the BMS 1 to the MTCU 7 or receives vehicle state information from the MTCU 7 and transmits them to the MCU 20. The protection circuit 70 is a secondary circuit for protecting the battery 2 from an over-current or an over-voltage by using hardware elements. The power-on reset unit 80 resets the overall system when the power source of the BMS 1 is turned on. The external interface 90 is for coupling auxiliary devices of the BMS 1, such as the cooling fan 4 and the main switch 6, to the MCU 20. In the present exemplary embodiment, the cooling fan 4 and the main switch 6 are illustrated as the auxiliary devices of the BMS 1, but this is not restrictive.

The MTCU 7 understands a present vehicle running state based on the vehicle accelerator, break, or vehicle speed information, and determines necessary information such as an amount of torque. In more detail, the present vehicle running state includes a key-on for turning on a starting, a key-off for turning off a starting, a subsidiary running, and an acceleration running. The MTCU 7 transmits the vehicle state information to the communication unit 60 of the BMS 1. The MTCU 7 controls an output of the motor generator 9 in accordance with the torque information. That is, the MTCU 7 controls the output of the motor generator 9 in accordance with the torque information by controlling a switch of the inverter 8. Also, the MTCU 7 receives the SOC of the battery 2 from the MCU 20 through the communication unit 60 of the BMS 1 and controls the SOC of the battery 2 to reach a target value (e.g., 55%). For example, when the SOC transmitted from the MCU 20 is lower than 55%, the MTCU 7 controls an electric power to flow toward the battery 2 by controlling the switch of the inverter 8 to thereby charge the battery 2. A battery current I may have a negative (−) value. When the SOC is higher than 55%, the ECU 7 controls the electric power to flow to the motor generator 9 by controlling the switch of the inverter 8 to discharge the battery 2. At this time, the battery current I may have a positive (+) value.

The inverter 8 charges/discharges the battery 2 in response to a control signal of the MTCU 7.

Based on the torque information transmitted from the MTCU 7, the motor generator 9 drives the vehicle by using electrical energy from the battery 2.

That is, the MTCU 7 prevents over-charging or over-discharging of the battery 2 by charging or discharging the battery 2 within an allowable range on the basis of the SOC information to thereby efficiently use the battery 2 for a longer time. However, since it is difficult to measure an accurate SOC after the battery 2 is installed in the vehicle, the BMS 1 must accurately measure the SOC by using the peak current and peak voltage that are sensed by the sensor 10 and deliver the measured SOC to the MTCU 7.

Figure 2:
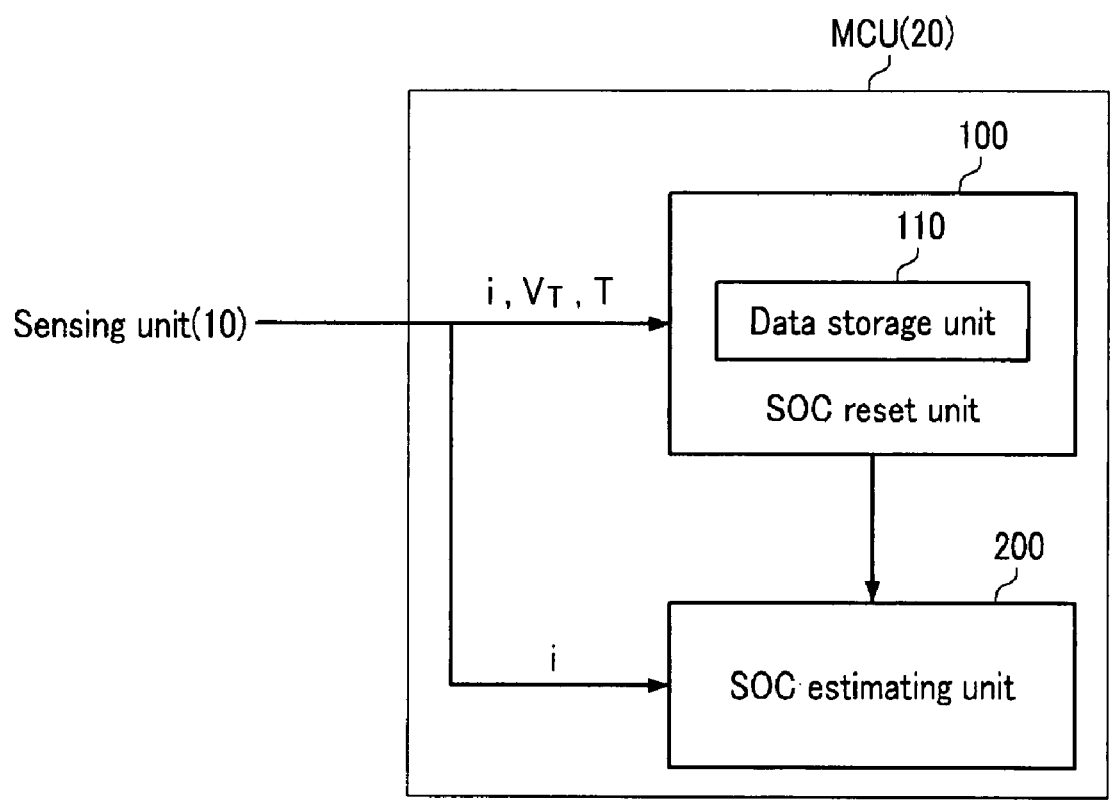
FIG. 2 is a block diagram of a Main Control Unit (MCU) 20 according to an exemplary embodiment of the present invention.
Figure 3A:
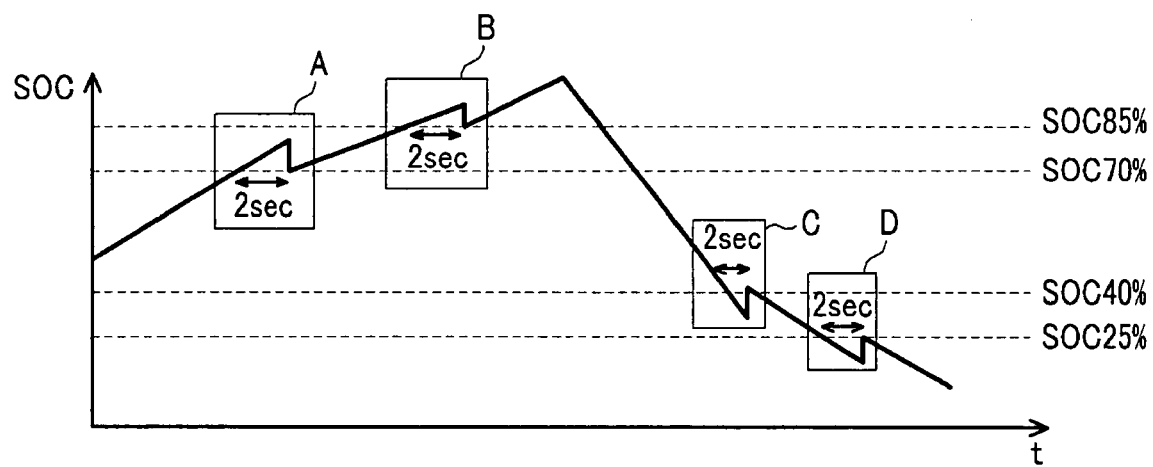
FIGS. 3A and 3B are graphs of a battery estimate State of Charge (SOC) reset in correspondence with an SOC reset condition according to an exemplary embodiment of the present invention.
Figure 3B:
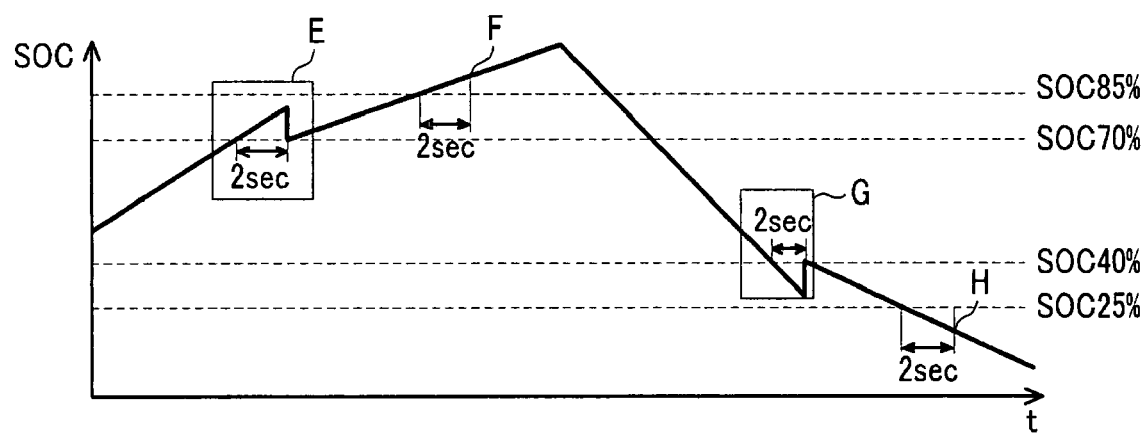
Figure 4:
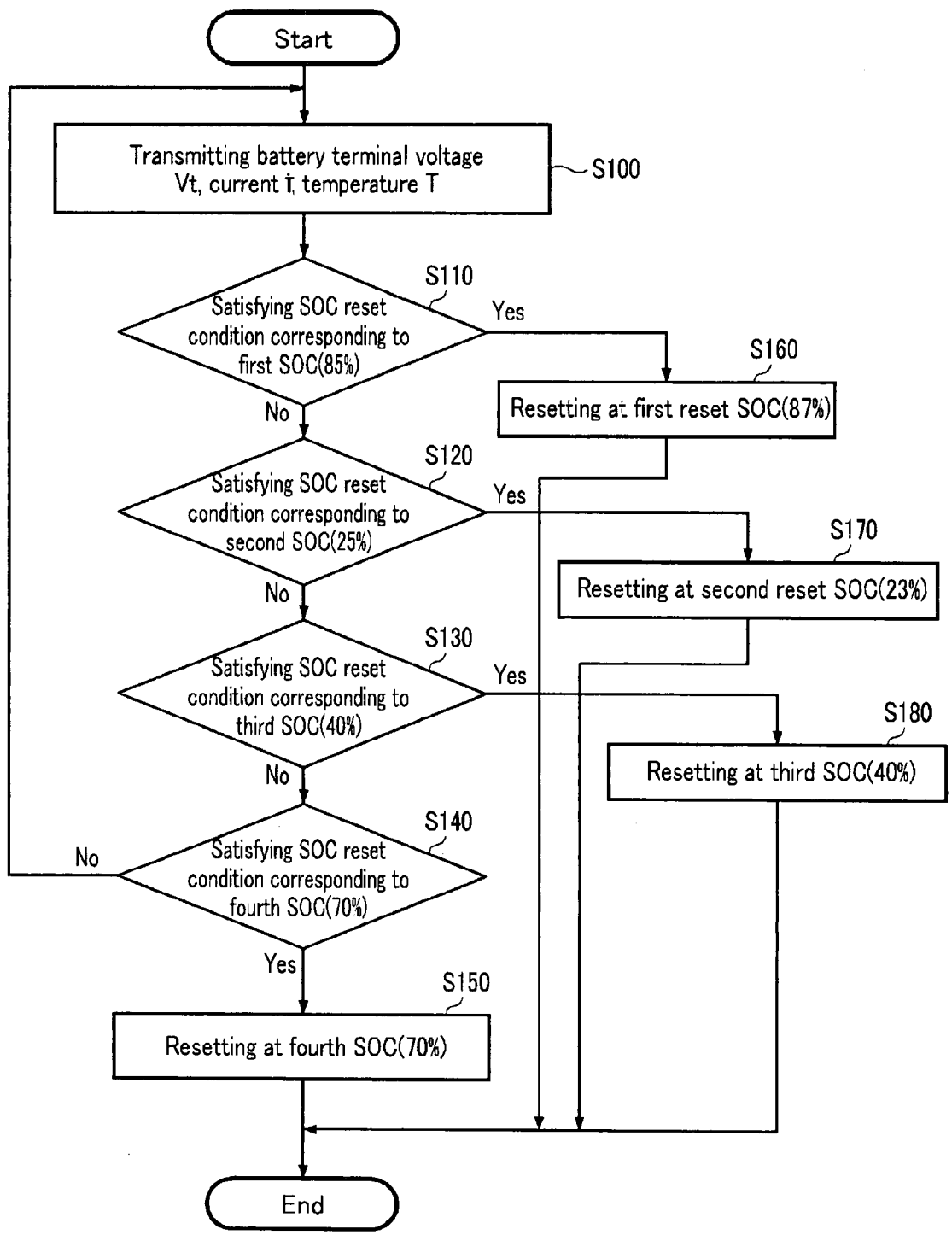
FIG. 4 is a flowchart of how to reset a battery estimate SOC in correspondence with an SOC reset condition according to an exemplary embodiment of the present invention.

A detailed description of how to reset a battery estimate SOC according to an exemplary embodiment of the present invention follows with reference to FIG. 2, FIG. 3, and FIG. 4.

FIG. 2 is a block diagram of the MCU 20 according to an exemplary embodiment of the present invention.

As shown in FIG. 2, the MCU 20 includes an SOC reset unit 100, a data storage unit 110, and an SOC estimating unit 200.

The SOC reset unit 100 includes the data storage unit 110, and receives the presently measured battery terminal voltage Vt, battery current i, and battery temperature T from the sensing unit 10. The data storage unit 110 includes SOC reset condition information therein. The SOC reset unit 100 compares the presently measured battery terminal voltage Vt, battery current i, and battery temperature T to the stored SOC reset condition, and resets a battery estimate SOC according to the comparison result.

The SOC reset unit 100 receives the battery terminal voltage Vt, battery current i, and battery temperature T from the sensing unit 10. The SOC reset unit 100 compares the presently measured battery terminal voltage Vt, battery current i, and battery temperature T to the stored SOC reset condition. The SOC reset unit 100 resets a battery estimate SOC to the first reset SOC (SOC 87%) when the SOC reset condition satisfies the first SOC (SOC 85%). The first reset SOC (SOC 87%) is calculated by correcting the first SOC (SOC 85%) by the reset estimate error (SOC 2%) which occurred in the SOC reset condition corresponding to the first SOC (SOC 85%). However, when the SOC reset condition does not satisfy the first SOC (SOC 85%), the SOC reset unit 100 compares the SOC reset condition to the second SOC (SOC 25%). The SOC reset unit 100 resets a battery estimate SOC to the first reset SOC (SOC 23%) when the SOC reset condition satisfies the second SOC (SOC 25%). The second reset SOC (SOC 23%) is calculated by correcting the second SOC (SOC 25%) by the reset estimate error (SOC 2%) which occurred in the SOC reset condition corresponding to the second SOC (SOC 25%). However, when the SOC reset condition does not satisfy the second SOC (SOC 25%), the SOC reset unit 100 compares the SOC reset condition to the third SOC (SOC 40%). The SOC reset unit 100 resets a battery estimate SOC to the third reset SOC (SOC 40%) when the SOC reset condition satisfies the third SOC (SOC 40%). However, when the SOC reset condition does not satisfy the third SOC (SOC 40%), the SOC reset unit 100 compares the SOC reset condition to the fourth SOC (SOC 70%). The SOC reset unit 100 resets a battery estimate SOC to the fourth reset SOC (SOC 70%) when the SOC reset condition satisfies the fourth SOC (SOC 70%).

The SOC estimating unit 200 estimates an SOC by integrating a battery current i to a current corresponding to the reset SOC transmitted from the SOC reset unit 100.

According to an exemplary embodiment of the present invention, the reset estimate error occurred in the SOC reset condition in correspondence with a predetermined time which the battery terminal voltage Vt, the battery current i, and the battery temperature T satisfy the SOC reset condition. According to an exemplary embodiment of the present invention, since the predetermined time is set as 2 sec, the occurred error is set as about SOC 2%. However, the present invention is not limited thereto, the reset estimate error may be changed in correspondence with a predetermined time which the battery terminal voltage Vt, the battery current i, and the battery temperature T satisfy the SOC reset condition. Accordingly, when the battery has the SOC reset condition corresponding to the first SOC (SOC 85%), the battery may be overcharged by the reset estimate error (SOC 2%) which occurred in the SOC reset condition. However, according to an exemplary embodiment of the present invention, the battery estimate SOC is reset from the first SOC (SOC 85%) to the first reset SOC (SOC 87%) by correcting the reset estimate error (SOC 2%) which occurred in the SOC reset condition corresponding to the first SOC(SOC 85%), and accordingly, the battery may be prevented from being overcharged due to the reset estimate error (SOC 2%). When the battery has the SOC reset condition corresponding to the second SOC (SOC 25%), the battery may be overcharged by the reset estimate error (SOC 2%) which occurred in the SOC reset condition. However, according to an exemplary embodiment of the present invention, the battery estimate SOC is reset from the second SOC (SOC 25%) to the second reset SOC (SOC 23%) by correcting the reset estimate error (SOC 2%) which occurred in the SOC reset condition corresponding to the second SOC (SOC 25%), and accordingly, the battery may be prevented from being overcharged due to the reset estimate error (SOC 2%).

FIG. 3A and FIG. 3B are graphs of a battery estimate SOC reset in correspondence with an SOC reset condition according to an exemplary embodiment of the present invention.

As shown in FIG. 3A, conventionally, in order to correct an error which occurred in the battery SOC estimate method, the battery estimate SOC is forcedly reset to the SOC (SOC 25%, SOC 40%, SOC 70%, and SOC 85%). As shown in FIG. 3A, when the SOC reset condition corresponds the first SOC (SOC 85%) included in the overcharge threshold range, the battery estimate SOC is reset to the reset SOC (SOC 85%)(B area). The battery may then be overcharged due to the reset estimate error. In addition, when the SOC reset condition corresponds the second SOC (SOC 25%) included in the overcharge threshold range, the battery estimate SOC is reset to the reset SOC (SOC 25%) (D area). The battery may then be overcharged due to the reset estimate error.

In order to prevent such an overcharge and over-discharge, as shown in FIG. 3B, the reset estimate error which occurred in the SOC reset conditions corresponding to the first SOC (SOC 85%) and the second SOC(SOC 25%) are corrected and the battery estimate SOC is reset. Particularly, when the SOC reset condition corresponds the first SOC (SOC 85%) included in the overcharge threshold range, the battery estimate SOC is reset to the first reset SOC (SOC 87%)(F point) by correcting the reset estimate error (SOC 2%) which occurred in the SOC reset condition. When the SOC reset condition corresponds the second SOC (SOC 25%) included in the overcharge threshold range, the battery estimate SOC is reset to the second reset SOC (SOC 23%)(H point) by correcting the reset estimate error (SOC 2%) which occurred in the SOC reset condition. Accordingly, since the battery estimate SOC is reset to the first and the second reset SOC (SOC 87% and SOC 23%) corrected by reset estimate error (SOC 2%), the battery overcharge and over-discharge may be prevented.

FIG. 4 is a flowchart of how to reset a battery estimate SOC in correspondence with an SOC reset condition according to an exemplary embodiment of the present invention.

The MCU 20 receives a battery terminal voltage Vt, a battery current i, and a battery temperature T from the sensing unit 10 (step S100), The MCU 20 compares the received SOC reset condition to the SOC reset condition corresponding to the first SOC (SOC 85%) (S110).

As a result of step S110, the MCU 20 resets a battery estimate SOC to the first reset SOC (SOC 87%) when the SOC reset condition satisfies the first SOC (SOC 85%) (step S160). As a result of step S110 when the SOC reset condition does not satisfy the first SOC (SOC 85%), the MCU 20 compares the SOC reset condition to the second SOC (SOC 25%) (step S120).

As a result of step S120, the MCU 20 resets a battery estimate SOC to the first reset SOC (SOC 23%) when the SOC reset condition satisfies the second SOC (SOC 25%) (step S170). As a result of step S120, when the SOC reset condition does not satisfy the second SOC (SOC 25%), the MCU 20 compares the SOC reset condition to the third SOC (SOC 40%) (step S130).

As a result of step S130, the SOC reset unit 100 resets a battery estimate SOC to the third reset SOC (SOC 40%) when the SOC reset condition satisfies the third SOC (SOC 40%) (step S180). However, as a result of step S130, when the SOC reset condition does not satisfy the third SOC (SOC 40%), the MCU 20 compares the SOC reset condition to the fourth SOC (SOC 70%) (step S140).

As a result of step S140, the SOC reset unit 100 resets a battery estimate SOC to the fourth reset SOC (SOC 70%) when the SOC reset condition satisfies the fourth SOC (SOC 70%) (step S150). However, as a result of step S140, when the SOC reset condition does not satisfy the fourth SOC (SOC 70%), the MCU 20 returns to step S100 and again performs a battery estimate SOC reset process.

As such, according to an exemplary embodiment of the present invention, when the SOC reset condition corresponds the first SOC (SOC 85%) included in the overcharge threshold range, the battery estimate SOC is reset to the first reset SOC (SOC 87%) by correcting the reset estimate error (SOC 2%) which occurred in the SOC reset condition. Accordingly, the overcharge due to the reset estimate error (SOC 2%) may be prevented. Likewise, when the SOC reset condition corresponds the second SOC (SOC 25%) included in the overcharge threshold range, the battery estimate SOC is reset to the second reset SOC (SOC 23%) by correcting the reset estimate error (SOC 2%) which occurred in the SOC reset condition. Accordingly, the overcharge due to the reset estimate error (SOC 2%) may be prevented.

While this invention has been described in connection with what is presently considered to be practical exemplary embodiments, it is to be understood that the present invention is not limited to the disclosed embodiments, but, on the contrary, is intended to cover various modifications and equivalent arrangements included within the spirit and scope of the appended claims.

The BMS and the driving method thereof according to an exemplary embodiment of the present invention may reset a battery estimate SOC by correcting a reset estimate error which occurred in the SOC reset condition when the SOC reset condition corresponds an overcharge threshold range.

The BMS and the driving method thereof according to an exemplary embodiment of the present invention may reset a battery estimate SOC by correcting a reset estimate error which occurred in the SOC reset condition when the SOC reset condition corresponds an over-discharge threshold range.

What is claimed is:

1. A Battery Management System (BMS) to managing a battery, the BMS comprising:
   a sensing unit to measure a battery terminal voltage, current, and temperature; and
   a Main Control Unit (MCU) to compare the measured battery terminal voltage, current, and temperature to a State of Charge (SOC) reset condition and to reset a battery estimate SOC according to the comparison result:
   wherein the MCU resets the battery estimate SOC to a first reset SOC in response to the SOC reset condition corresponding to a first SOC and resets the battery estimate SOC to a second reset SOC in response to the SOC reset condition corresponding to a second SOC.

2. The BMS of claim 1, wherein the first reset SOC is different from the first SOC and compensates for a reset estimate error to the first SOC, the reset estimate error occurring in the SOC reset condition corresponding to the first SOC.

3. The BMS of claim 1, wherein the second reset SOC is different from the second SOC and compensates for a reset estimate error to the second SOC, the reset estimate error occurring in the SOC reset condition corresponding to the second SOC.

4. The BMS of claim 3, wherein the first SOC is a minimum value within an overcharge threshold range of the battery.

5. The BMS of claim 4, wherein the second SOC is a maximum value within an overcharge threshold range of the battery.

6. A method of managing a battery by driving a Battery Management System (BMS) to reset a battery estimate State of Charge (SOC), the method comprising:

measuring, using a sensing unit, a battery terminal voltage, current, and temperature and comparing the measured battery terminal voltage, current, and temperature to said SOC reset condition;

resetting, using a Main Control Unit (MCU), the battery estimate SOC to a first reset SOC when the SOC reset condition corresponds to a first SOC; and resetting, using said MCU the battery estimate SOC to a second reset SOC when the SOC reset condition corresponds to a second SOC.

7. The method of claim 6, wherein the first reset SOC is different from the first SOC and compensates for a reset estimate error to the first SOC, the reset estimate error occurring in the SOC reset condition corresponding to the first SOC.

8. The method of claim 6, wherein the second reset SOC is different from the second SOC and compensates for a reset estimate error to the second SOC, the reset estimate error occurring in the SOC reset condition corresponding to the second SOC.

9. The method of claim 8, wherein the first SOC is a minimum value within an overcharge threshold range of the battery.

10. The method of claim 9, wherein the second SOC is a maximum value within an overcharge threshold range of the battery.

* * * * *